United States Patent
Köhler et al.

(10) Patent No.: US 6,893,761 B2
(45) Date of Patent: May 17, 2005

(54) PROCESS FOR PRODUCING A MEMBRANE ELECTRODE ASSEMBLY AND THE MEMBRANE ELECTRODE ASSEMBLY PRODUCED THEREBY

(75) Inventors: Joachim Köhler, Gründau/Haingründau (DE); Anita Krämer, Neuberg (DE); Karl-Anton Starz, Rodenbach (DE); Knut Fehl, Schlüchtern-Ramholz (DE); Armin Bayer, Freigericht (DE)

(73) Assignee: Umicore AG & Co. KG, Hanau (DE)

(*) Notice: Subject to any disclaimer, the term of this patent is extended or adjusted under 35 U.S.C. 154(b) by 0 days.

(21) Appl. No.: 10/147,102

(22) Filed: May 15, 2002

(65) Prior Publication Data

US 2003/0059658 A1 Mar. 27, 2003

(30) Foreign Application Priority Data

May 22, 2001 (EP) ............................................. 01112426

(51) Int. Cl.[7] .............................................. H01M 8/10
(52) U.S. Cl. ............................. 429/30; 429/44; 264/345
(58) Field of Search ............................. 429/40, 41, 44, 429/42, 33, 30; 264/345

(56) References Cited

U.S. PATENT DOCUMENTS

| 5,395,705 A | 3/1995 | Door et al. |
|---|---|---|
| 5,992,008 A | 11/1999 | Kindler |
| 5,998,057 A | 12/1999 | Koschany et al. |
| 6,001,500 A | * 12/1999 | Bass et al. .................... 429/31 |
| 6,183,898 B1 | 2/2001 | Koschany et al. |
| 6,218,035 B1 | 4/2001 | Fuglevand et al. |

FOREIGN PATENT DOCUMENTS

| CA | 2052221 | 5/1992 |
|---|---|---|
| EP | 0 928 036 A1 | 7/1999 |

OTHER PUBLICATIONS

European Search Report, Dec. 13, 2001.

* cited by examiner

Primary Examiner—Raymond Alejandro
(74) Attorney, Agent, or Firm—Kalow & Springut LLP

(57) ABSTRACT

The invention comprises a process for making a membrane electrode assembly comprising a polymer electrolyte membrane having two opposite faces, on each face of which is applied a catalyst layer and a gas distribution layer. The two gas distribution layers in the membrane electrode assembly are formed by hydrophobized carbon substrates which, using appropriate inks containing at least one catalyst, dissolved ionomer and solvent, are each coated with a catalyst layer and are then laid on opposite faces of the polymer electrolyte membrane with the catalyst layers still in the moist state. Afterwards, a firm bond between electrolyte membrane, catalyst layers and carbon substrates is produced by treating the membrane electrode assembly at elevated temperature under pressure.

9 Claims, 3 Drawing Sheets

PROCESS FOR PRODUCING A MEMBRANE ELECTRODE ASSEMBLY AND THE MEMBRANE ELECTRODE ASSEMBLY PRODUCED THEREBY

FIELD OF THE INVENTION

The present invention provides membrane electrode assemblies and processes for producing membrane electrode assemblies for fuel cells.

BACKGROUND OF THE INVENTION

A membrane electrode assembly can produce electrical energy by separating fuel oxidation, usually hydrogen, and oxygen reduction. The oxidation of hydrogen takes place at the anode in the presence of an anode catalyst. The electrons released in this process flow to the cathode via an external circuit while the protons formed migrate through the membrane and react with oxygen on the cathode catalyst to form water.

A membrane electrode assembly consists of a proton-conducting polymer electrolyte membrane, the two opposite faces of which are each coated with catalyst layers. To make electrical contact with the catalyst layers and to supply and remove the fuel, oxygen and water, gas distribution layers are laid onto the catalyst layers, these consisting of porous, electrically conductive, hydrophobized carbon substrates and a contact layer. The porosity of the carbon substrate is in the range between 50 and 95%. The average pore diameter is 30 to 50 $\mu$m and the thickness is between 100 and 400 $\mu$m.

The contact layers in the gas distribution layers improve contact between the catalyst layers and the porous carbon substrates. The contact layers normally consist of a mixture of a conductive carbon black and a hydrophobic polymer such as, for example, polytetrafluoroethylene (PTFE) and have a lower porosity than the gas distribution layers. They are often also called "microlayers" because their average pore diameter is less than 1 $\mu$m.

The proton-conducting materials in the polymer electrolyte membrane are also called ionomers. A tetrafluorethylene-fluorovinylether copolymer with acid functions, in particular sulfonic acid groups, is preferably used. Such a material is marketed by E. I. DuPont, for example, under the tradename Nafion®. However, other, in particular fluorine-free, ionomer materials such as sulfonated polyetherketones or arylketones or polybenzimidazoles can also be used. Polymer electrolyte membranes generally have a thickness between 30 and 100 $\mu$m.

The catalyst layers for the anode and cathode, on opposite faces of the polymer electrolyte membrane, contain a suitable catalyst which is dispersed in a porous layer consisting of an ion-conducting polymer and optionally a binder, wherein the ion-conducting polymer is usually the same as the polymer from which the membrane is also made. A fluorinated polymer, such as PTFE for example, is often used as the binder. The porous structure of the electrode layers ensures optimum three-phase contact between the ion-conducting ionomer, the catalyst and the gaseous reactants. This enables easy exchange of protons between the polymer electrolyte membrane and the active centers in the catalyst and leads to good electrochemical performance data for the fuel cell.

Noble metal blacks, that is finely divided particles of platinum or its alloys, or supported catalysts made of finely divided carbon particles, such as for example carbon black, on which the catalyst is deposited in high dispersion, are suitable as catalysts. The carbon substrates on the gas distribution layers mostly consist of a porous carbon fiber fabric, a carbon fiber non-woven or a carbon fiber paper. Carbon substrates are rendered water repellent by impregnating them with a dispersion of a hydrophobic material in order to avoid the condensation of water vapor in the pores of the substrate. A PTFE dispersion is often used for impregnating. After impregnation, the carbon substrates are heated to a temperature above the melting point of PTFE (about 340 to 390° C.). The purpose of the carbon substrates or gas distribution layers is to carry the gaseous reactants to the catalyst layers and to remove the water being formed at the cathode.

Many processes for producing membrane electrode assemblies of the type described above are known in the art. For example, a so-called Decal process is used to coat the polymer electrolyte unit with the catalyst layers. In this case, a protective film is first coated with a catalyst ink which contains a platinum supported catalyst and dissolved ionomer. The catalyst layer on the protective film is dried in an oven at 135° C. and then pressed at 145° C. under a pressure of between 70 and 90 bar onto a polymer electrolyte membrane. The protective film is then pulled off. Alternatively, the polymer electrolyte membrane can also be coated directly with the catalyst ink, in accordance with another process known in the art. In this case, coating takes place on the membrane heated to 160° C. and leads to a catalyst layer of high integrity and elasticity. Optionally, the polymer electrode membrane provided with the catalyst layers can be hot-compressed at 70 to 90 bar and a temperature of 185° C. To form a fuel cell, gas distribution layers which consist of a hydrophobized carbon substrate and a contact layer are laid on the catalyst layers.

Alternatively, it is also known in the art that the catalyst layers can be applied to the gas distribution layers, wherein these gas distribution layers are also provided with a contact layer of carbon black and PTFE prior to applying the gas distribution layers, in order to prevent the catalyst pastes from penetrating too deeply into the porous carbon substrate. Gas distribution electrodes are formed in this way and these are obtainable commercially, for example from the ETEK Co. To form a fuel cell, these gas distribution electrodes are applied to both faces of a polymer electrolyte membrane. As is known in the art, electrical connection of the electrodes to the membrane can be improved by impregnating the catalyst layers with, for example, a solution of an ionomer. The impregnated electrodes are dried before they are used to make up fuel cells.

Also known in the art is a gas distribution layer made of a carbon fiber fabric for membrane electrode assemblies. The carbon fiber fabric is also coated on the face turned towards the relevant catalyst layer, with a contact layer of carbon black and a fluoropolymer which is porous and water-repellent and is also electrically conductive and in addition has a fairly smooth surface. This contact layer preferably penetrates not more than half way into the carbon fiber fabric. The carbon fiber fabric can be pretreated with a mixture of carbon black and a fluoropolymer to improve its water-repellent properties.

Also known in the art is a gas distribution layer (here "intermediate layer") which is obtainable by infiltrating and/or coating one face of a coarse-pored carbon substrate (carbon paper, graphite paper or carbon non-woven) with a composition of carbon black and a fluoropolymer, which reduces the porosity of the portion of the carbon substrate close to the surface and/or forms a discrete layer of reduced porosity on the surface of the substrate. The gas distribution layer is laid on membrane electrode assemblies with this coating against the catalyst layers. It is known in the art that the object of the coating, to form good electrical contact with the catalyst layers, is achieved in this way.

Coating the carbon substrates in accordance with methods known in the art with a contact layer of a carbon black/PTFE mixture is costly and requires subsequent drying and calcination at 330 to 400° C.

Based on the foregoing, there is a need in the art for a simplified and cost-effective process for producing membrane electrode assemblies that is suitable in particular for the processing of thin polymer electrolyte membranes. The resulting membrane electrode assemblies should form a compact, tightly bonded unit. There is also a need in the art for the membrane electrode assembly produced using the process.

SUMMARY OF THE INVENTION

In one embodiment, the invention comprises a method of making a membrane electrode assembly, comprising: (a) applying a gas distribution layer to each opposite face of a polymer electrolyte membrane having two opposite faces, wherein the gas distribution layer on each opposite face is formed by hydrophobized carbon substrates, and wherein the hydrophobized carbon substrates have one or more inks with at least one catalyst, a dissolved ionomer and solvent, so as to form a catalyst layer, on each opposite face of the polymer electrolyte membrane; and, (b) treating the membrane electrode assembly at elevated temperature under pressure while the catalyst layers are moist, so as to establish a firm bond between the electrolyte membrane, the catalyst layers, and the hydrophobized carbon substrates, thereby making a membrane electrode assembly. In another embodiment, the invention comprises a membrane electrode assembly made by a method in accordance with the above.

In another embodiment, the invention comprises a membrane electrode assembly for polymer electrolyte membrane fuel cells, comprising: a polymer electrolyte membrane with two opposite faces, wherein one face forms an anode side of a fuel cell, and the second face forms a cathode side of a fuel cell; a catalyst layer disposed on the cathode and the anode side; and, a gas distribution layer on each side of the anode and cathode sides, wherein the gas distribution layers comprise a hydrophobized carbon substrate and wherein the gas distribution layers are in direct contact with the catalyst layers in the membrane electrode assembly.

For a better understanding of the present invention together with other and further advantages and embodiments, reference is made to the following description taken in conjunction with the examples, the scope of which is set forth in the appended claims.

The preferred embodiments of the invention have been chosen for purposes of illustration and description but are not intended to restrict the scope of the invention in any way. The preferred embodiments of certain aspects of the invention are shown in the accompanying figures.

DETAILED DESCRIPTION OF THE INVENTION

Figure 1:
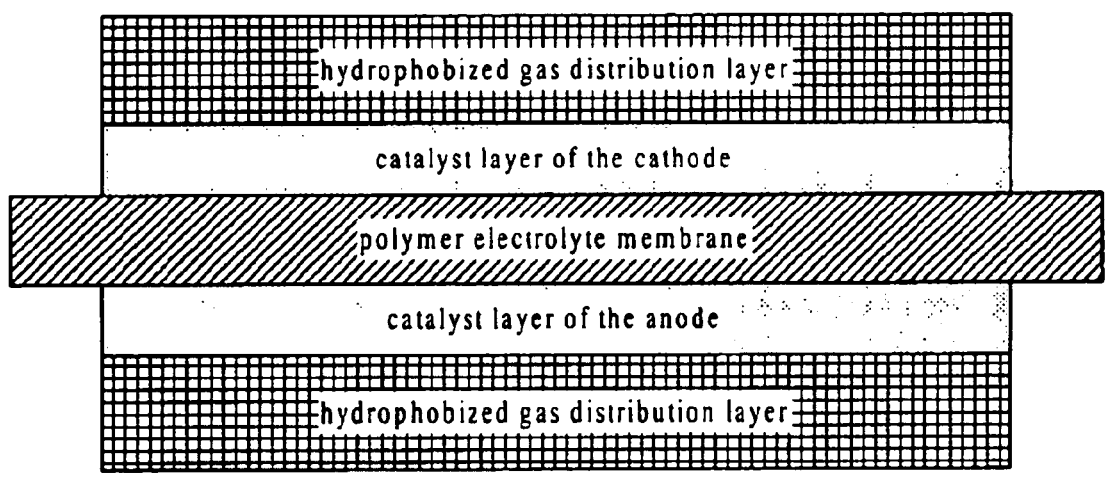
FIG. 1: Illustrates the structure of a typical membrane electrode assembly, having a polymer electrolyte membrane, catalyst layers and hydrophobized gas distribution layers.

The present invention will now be described in connection with preferred embodiments. These embodiments are presented to aid in an understanding of the present invention and are not intended to, and should not be construed, to limit the invention in any way. All alternatives, modifications and equivalents that may become obvious to those of ordinary skill upon reading the disclosure are included within the spirit and scope of the present invention.

This disclosure is not a primer on membrane electrode assemblies or methods of preparing membrane electrode assemblies. Basic concepts known to those skilled in the art have not been set forth in detail.

The present invention comprises a membrane electrode assembly that includes a polymer electrolyte membrane with two opposite faces, on each of which are applied a catalyst layer and a gas distribution layer. The two gas distribution layers in the membrane electrode assembly are formed by hydrophobized carbon substrates which using appropriate inks containing at least one catalyst and dissolved ionomer and solvent are each coated with a catalyst layer. They are then laid on opposite faces of the polymer electrolyte membrane with the catalyst layers still in the moist state A firm bond between electrolyte membrane, catalyst layers and carbon substrates is produced by treating the membrane electrode assembly at elevated temperature under pressure.

The present invention provides that an otherwise conventional contact layer between the catalyst layer and the carbon substrate can be omitted without the impairment of electrochemical performance of the membrane electrode assembly. This is achieved by applying the catalyst layers directly to the hydrophobized carbon substrate, using a suitable ink, and laying the carbon substrates on both faces of the polymer electrolyte membrane with the catalyst layers in the moist state. This saves one working step and facilitates the formation of a firm bond between the components in the membrane electrode assembly.

The combination of hydrophobized carbon substrate and catalyst layer is also referred to as a gas distribution electrode in the following.

After laying the gas distribution electrodes on opposite sides of the polymer electrolyte membrane, with the catalyst layers still in the moist state, the resulting sandwich structure is dried under pressure at elevated temperature. Drying preferably takes place in two steps. The sandwich structure is first dried at a temperature between about 70 and about 100° C. and at a pressure between about 1 and about 5 bar. Then the temperature is increased to a value between about 120 and about 145° C. and the pressure is increased to about 10 to about 120 bar. The drying time in both steps is between about 1 and about 10 minutes. The actual compression pressure used depends on the type of carbon substrate. Carbon fiber papers are generally more pressure-sensitive than carbon fiber fabrics. If a carbon fiber paper is used for the gas distribution layer then the compression pressure in the first step should not exceed about 2 bar and in the second step should not exceed about 30 bar. In the case of carbon fiber fabrics, higher compression pressures can be used.

The invention thus enables problem-free processing of pressure-sensitive carbon fiber papers. The pressures applied, up to about 30 bar, are substantially below those which have to be used during conventional hot-compression of dried catalyst layers in order to produce a firm bond between the catalyst layer and the polymer electrolyte membrane and the gas distribution layer.

When producing membrane electrode assemblies, the ionomer materials are frequently used in a $Na^+$ or $K^+$ ion-exchanged form because this form is more thermally stable. Afterwards, these exchanged ionomer materials have to be reprotonated by treatment in hot sulfuric acid. In contrast, it has been shown that such an ion exchange procedure is not required in the present invention. The ionomer materials can thus be used directly in the $H^-$ form without detrimental effects in subsequent performance. Reprotonation of the ionomer materials is thus not required in the present invention.

Polymer electrolyte membranes known in the prior art are suitable for use in the process. If these materials are placed in contact with water or other solvents, depending on the solvent used, they absorb up to about 30 wt. % of solvent and thus swell. The membranes may be used either in the pre-swollen or in the non-swollen state in the present invention. The solvents used for the catalyst are expediently used to pre-swell the membranes.

A platinum catalyst on carbon black is preferably used as the cathode catalyst. The preferred loading of carbon black with platinum is in the range between about 20 and about 75 wt. %, with respect to the total weight of platinum and carbon black. A catalyst which contains platinum and ruthenium in the ratio by weight of about 2:1 on carbon black is suitable as anode catalyst, wherein the concentration of the platinum group metals, with respect to the total weight of catalyst, is also in the range between about 20 and about 75 wt. %.

To make up the catalyst inks, these catalysts are dispersed in a solution of an ionomer. The solution may be aqueous or may also contain organic solvents. To adjust the hydrophobicity of the subsequently formed catalyst layer, hydrophobic polymers such as, for example, PTFE, may also be added to the dispersion. The ratio by weight of electrocatalyst to ionomer in the catalyst layer is preferably between about 10:1 and about 1:1. The catalyst inks may also contain pore-producers. Inks are preferably used which contain largely water as solvent and thus are hydrophilic. Suitable inks are known in the art. For example, some suitable inks for use in the present invention are described in German patent application document DE 100 37 074.

Either woven carbon fiber fabrics or carbon fiber non-wovens or carbon fiber papers with a thickness between about 100 and about 400 μm can be used for the gas distribution electrodes. The porosity of these materials can be between about 50 and about more than 90%. In order to prevent flooding the pores with the water being formed during the catalytic reaction at the cathode, these carbon substrates are impregnated with a dispersion of a hydrophobic polymer and then sintered at a temperature higher than the melting point of the hydrophobic polymer. For example, if PTFE is used as the hydrophobic polymer, then temperatures between about 340 and about 390° C. are needed for this. Loading of the gas distribution electrodes with PTFE is preferably between about 1 and about 30 wt. %, with respect to the total weight of hydrophobized carbon substrate.

Membrane electrode assemblies produced in this way contain a polymer electrolyte membrane with two opposite faces, one of which forms the anode side and the second the cathode side in a fuel cell. A catalyst layer and a gas distribution layer are located on the anode and on the cathode faces. The membrane electrode assembly has gas distribution layers that comprise a hydrophobized carbon substrate and are in direct contact with the catalyst layers in the membrane electrode assembly. Thus, membrane electrode assemblies according to the invention do not have a contact layer between the hydrophobized carbon substrate and the catalyst layer.

Having now generally described the invention, the same may be more readily understood through the following reference to the following examples, which are provided by way of illustration and are not intended to limit the present invention unless specified.

EXAMPLES

The following examples are intended to explain the invention further.

Example 1

Using the simplified process proposed for producing membrane electrode assemblies, materials such as, for example, ductile carbon fiber papers, which normally cannot be compressed under high pressure without destroying their open, coarse-pored structure, can be processed. The advantage of the process in question will be explained more clearly using the following examples of preferred embodiments of the present invention.

To make a membrane electrode assembly in accordance with the process proposed, catalyst inks with the following compositions were prepared:

Composition of the Cathode Ink:

| | |
|---|---|
| 14.0 g | Pt supported catalyst (40 wt. % Pt on carbon black, from Dmc[2]) |
| 43.0 g | Nafion ® solution (10 wt. % in water) |
| 10.0 g | Dipropylene glycol |
| 33.0 g | Water (fully deionised) |
| 100.0 g | |

Composition of the Anode Ink:

| | |
|---|---|
| 14.0 g | PtRu supported catalyst (40 wt. % PtRu on carbon black: 26.4 wt. % Pt, 13.6 wt. % Ru; catalyst according to U.S. Pat. No. 6,007,934) |
| 42.0 g | Nafion ® solution (10 wt. % in water) |
| 10.0 g | Dipropylene glycol |
| 33.0 g | Water (fully deionised) |
| 100.0 g | |

A carbon fiber paper with a thickness of 250 μm and a porosity of 85% was used as the gas distribution layer for the cathode side. The carbon fiber paper was hydrophobized with PTFE. The PTFE loading was 8 wt. %.

The cathode ink was applied directly to the gas distribution layer using screen printing. The platinum loading of the cathode prepared in this way was 0.45 mg $Pt/cm^2$, the active cell area was 50 $cm^2$.

The same substrate material was used as gas distribution layer for the anode side as for the cathode side. The gas distribution layer was hydrophobized with 16 wt. % PTFE and then also directly coated with the anode ink using screen printing. The anode prepared in this way had a loading of 0.3 mg $Pt/cm^2$ and 0.15 $Ru/cm^2$, the active area was 50 $cm^2$.

To prepare the membrane electrode assembly, an ionomer membrane (Nafion 112, DuPont Co., thickness of the membrane: 50 µm), swollen in water, was introduced between the cathode and anode with the catalyst layers still undried and initially dried at a temperature of 80° C. and a pressure of about 1 bar. After 8 minutes the temperature and pressure were increased to 130° C. and about 20 bar and held constant for 1 minute.

Figure 2:
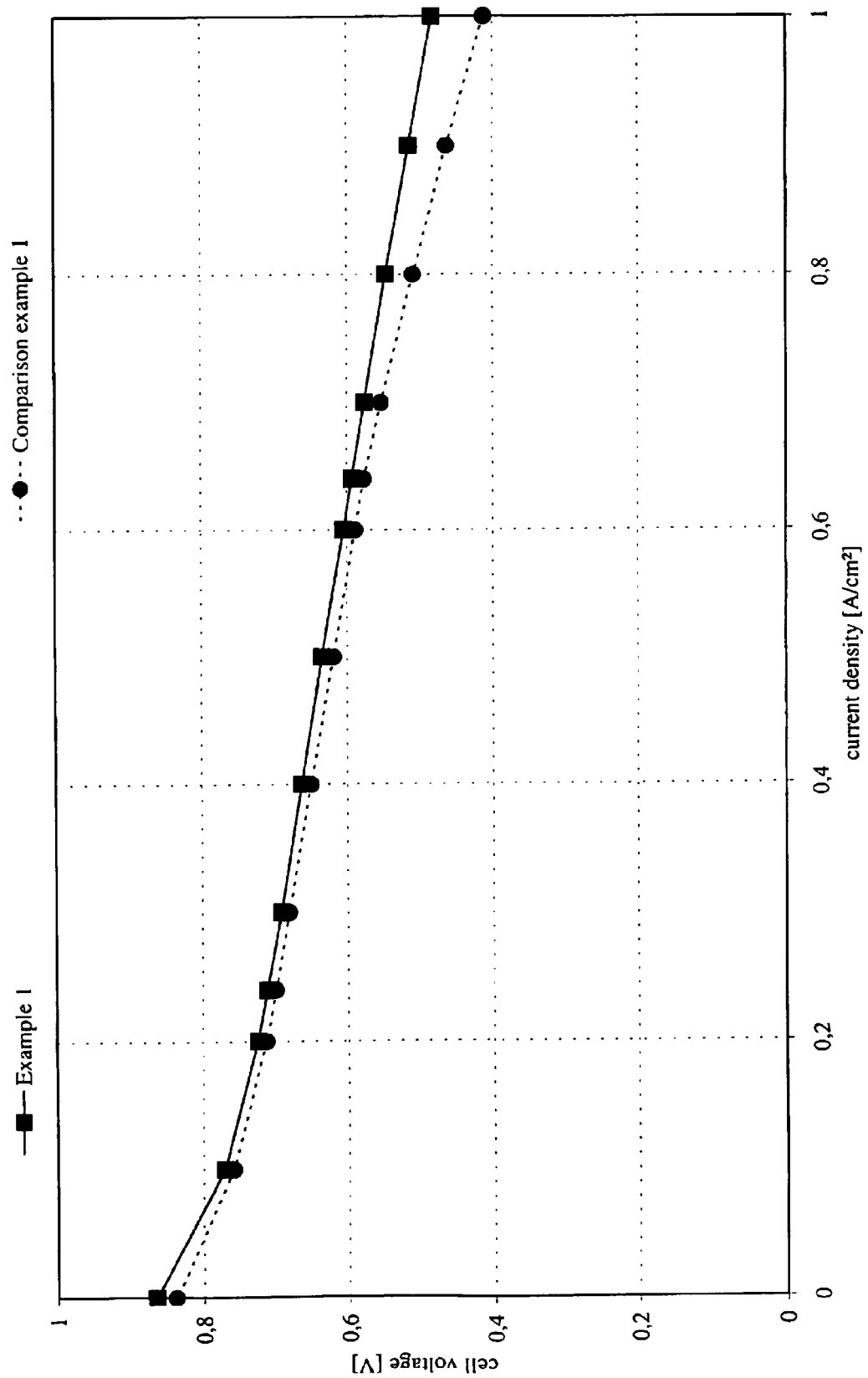
FIG. 2: Performance curves for the membrane electrode assemblies described in Example 1 and Comparison Example 1.

An intimate bond was obtained between the three components (cathode, polymer membrane and anode) and these could no longer be separated from each other without the use of considerable force. The membrane electrode assembly produced in this way was incorporated into a test cell and measurements were performed. A gas mixture of 40% $H_2$, 35% $N_2$, 25% $CO_2$, 40 ppm CO and an airbleed of 2% air was used as the anode gas. Air was used as the cathode gas. The cell temperature was 70° C. Anode moistening occurred at 85° C. and cathode moistening occurred at 55° C. The pressure of the working gases was 1 bar (absolute). The stoichiometry of the gases was 1.25 (anode gas) and 2.5 (cathode gas). The cell voltages, measured as a function of current density, are shown in FIG. 2.

Comparison Example 1

In order to demonstrate the effect of the membrane electrode assemblies prepared in Example 1 using undried catalyst layers, another membrane unit was made up for the comparison example.

The same substrate material was used for the gas distribution layers as was used in Example 1. Hydrophobizing was performed in the same way as in Example 1 using 16 wt. % (anode side) and 8 wt. % (cathode side).

The catalyst inks used corresponded to the inks described in Example 1. The catalyst inks were also applied directly to the gas distribution layers using the same procedures as in Example 1.

The noble metal loadings of the cathode and anode prepared in this way were 0.49 mg $Pt/cm^2$ and 0.34 mg $Pt/cm^2$ and 0.17 $Ru/cm^2$ respectively on active cell areas of 50 $cm^2$ each. The catalyst layers on the anode and cathode were dried in an oven at 80° C. for 5 to 10 min before assembling the membrane electrode assembly.

To complete production of the membrane electrode assembly, an ionomer membrane (Nafion 112, DuPont Co., thickness of membrane: 50 µm), pre-swollen in water, was inserted between the dried anode and cathode. The cathode, membrane and anode were then compressed together under exactly the same conditions as in Example 1.

The final membrane electrode assembly was incorporated in a PEM fuel cell and measurements were performed. The operating conditions used were the same as those in Example 1. The cell voltages, measured as a function of current density, are shown in FIG. 1, where they are compared with those from the membrane electrode assembly from Example 1.

The carbon fiber paper used as the gas distribution substrate in Example 1 and Comparison Example 1 is known in the art as a comparatively readily compressible material, the porous structure of which can be noticeably damaged under relatively high pressures (e.g. >30 bar). Many processes for producing membrane electrode assemblies, however, attempt to optimise the contact between membrane and catalyst by applying a high pressure. In the case of readily compressible materials, however, these processes can be used to only a limited extent because the water balance in the membrane electrode assembly, and thus also the performance data, is impaired by destruction of the pore structure. The process described here now offers an opportunity to create an intimate bond between the catalyst layers and the polymer membrane, by also applying a low contact pressure, and thus to produce high-performance membrane electrode assemblies.

FIG. 2 shows a striking performance difference in the current/voltage curves, wherein the membrane electrode assembly which was produced by the process described in Example 1 has a cell voltage which is improved by 10–20 mV. Also, the performance data in the lower current density region (<200 $mA/cm^2$) is affected in a positive manner. This reflects the greatly improved contact between membrane and catalyst in the electrodes which is probably produced by the swollen ionomer contained in the catalyst inks functioning as a binder.

Furthermore, the substantially improved performance data for the membrane electrode assemblies produced in accordance with the invention in the high current density region (>700 $mA/cm^2$) are striking. Here, a cell voltage increased by 50 to 80 mV is obtained. This performance difference points to a better pore system in the membrane electrode assembly which was produced by the process described here and the improved water balance resulting therefrom. The water evaporating under high temperatures likely functions as a pore-producer which prevents or compensates for too great a compression of the gas distribution layers even under the pressures being applied.

Example 2

The process described can be applied to comparatively dimensionally stable carbon substrates such as, for example, those represented by carbon fiber fabrics. These materials are also only slightly compressible under high pressure. Therefore, in principle, higher pressures can be used to compress them with the ionomer membrane, which ensures a good connection between catalyst and membrane. This example shows that, even under comparatively high pressures, the process cited here leads to better performance data under comparable conditions of production.

The catalyst inks used were the same as the inks described in Example 1. Application of the catalyst inks directly to the gas distribution layers, which in this case comprise largely incompressible, hydrophobized carbon fiber fabric (thickness 200 µm; porosity 90%) also took place using the same procedure as in Example 1. The anode and cathode gas distributions were made hydrophobic in the same way as in Example 1.

The noble metal loading of the cathode and anode prepared in this way were 0.58 mg $Pt/cm^2$ or 0.30 mg $Pt/cm^2$ and 0.15 $Ru/cm^2$ respectively on active cell areas of 50 $cm^2$.

The membrane electrode assembly was produced in the same way as in Example 1 by introducing an ionomer membrane (Nafion 112, DuPont Co., thickness of membrane: 50 µm), pre-swollen in water, between the cathode and anode with the catalyst layers still undried. The unit was first dried at a temperature of 100° C. and a pressure of 2 bar. After 6 minutes, the temperature and pressure were increased to 130° C. and 100 bar and held constant for 2 minutes.

Here again, as in Example 1, an intimate bond was produced between the three components (cathode, polymer membrane and anode) which could no longer be separated from each other without the use of considerable force.

Figure 3:
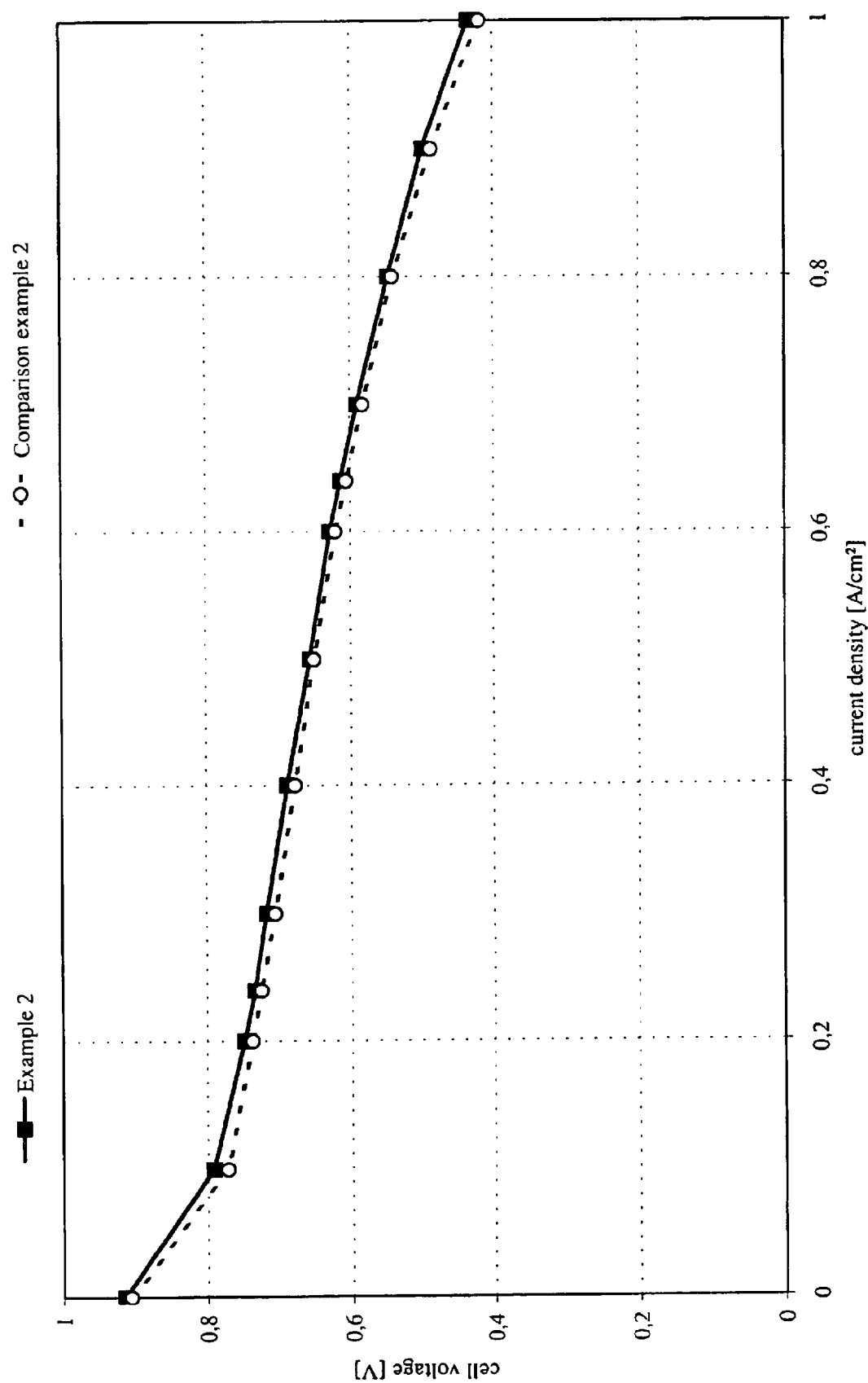
FIG. 3: Performance curves for the membrane electrode assemblies described in Example 2 and Comparison Example 2.

The membrane electrode assembly produced in this way was incorporated into a test cell and measurements were made. The operating conditions used were the same as those used in Example 1. The cell voltages measured, as a function of current density when operated with reformate/air, are shown in FIG. 3.

Comparison Example 2

For comparison with Example 2, another membrane electrode assembly was made in which the catalyst layers were dried before assembly.

The same substrate material was used as in Example 2. Hydrophobizing was performed in the same way as in example 2 with 16 wt. % (anode side) and 8 wt. % (cathode side).

The catalyst inks used corresponded to the inks described in Example 1. The catalyst inks were applied directly to the gas distribution layers using the same procedures as in Example 2.

The noble metal loadings of the cathode and anode prepared in this way were 0.59 mg $Pt/cm^2$ and 0.32 mg $Pt/cm^2$ and 0.16 $Ru/cm^2$ respectively on active cell areas of 50 $cm^2$ each. The catalyst layers on the anode and cathode were dried in an oven at 80° C. for 5 to 10 min.

The membrane electrode assembly was produced by introducing an ionomer membrane (Nafion 112, DuPont Co., thickness of membrane: 50 $\mu$m), pre-swollen in water, between the dried anode and cathode and then compressing under exactly the same conditions as described in Example 2.

The membrane electrode assembly produced in this way was incorporated in a PEM fuel cell and measurements were performed. The operating conditions used were the same as those in Example 2. The cell voltages, measured as a function of current density, are shown in FIG. 3, where they are compared with those from the membrane electrode assembly from Example 2.

There is a performance difference in the current/voltage curves of 10 to 15 mV, in particular in the lower current region (<200 $mA/cm^2$). Here again the membrane electrode assembly according to Example 2 has the advantage. In comparison to FIG. 2, however, the performance data of both membrane electrode assemblies are substantially the same at higher current densities. This shows that the higher contact pressure itself leads to a good connection between the electrodes and the membrane.

While the invention has been described in connection with specific embodiments thereof, it will be understood that it is capable of further modifications and this application is intended to cover any variations, uses, or adaptations of the invention following, in general, the principles of the invention and including such departure from the present disclosure as come within known or customary practice within the art to which the invention pertains and as may be applied to the essential features hereinbefore set forth and as follows in the scope of the appended claims.

What is claimed is:

1. A method of making a membrane electrode assembly, comprising:

(a) applying a gas distribution layer to each opposite face of a polymer electrolyte membrane having two opposite faces, wherein the gas distribution layer on each opposite face is formed by hydrophobized carbon substrates, and wherein the hydrophobized carbon substrates have one or more inks with at least one catalyst, a dissolved ionomer and solvent, so as to form a catalyst layer, on each opposite face of the polymer electrolyte membrane; and, (b) treating the membrane electrode assembly at elevated temperature under pressure while the catalyst layers are moist, so as to establish a firm bond between the electrolyte membrane, the catalyst layers, and the hydrophobized carbon substrates, thereby making a membrane electrode assembly.

2. A method according to claim 1, wherein hydrophilic inks are employed to produce the catalyst layers.

3. A method according to claim 2, wherein the inks contain water as the main solvent.

4. A method according to claim 1, wherein prior to making the electrode assembly the polymer electrolyte membrane is pre-swollen in the solvent employed for the catalyst layers.

5. A method according to claim 1, wherein polytetrafluoroethylene is loaded onto the carbon substrate, and wherein the polytetrafluoroethylene loading on the carbon substrate is between about 1% and about 30% by weight, with respect to the total weight of the hydrophobized carbon substrate.

6. A method according to claim 1, wherein in step (b), the membrane electrode assembly is treated for about one to about ten minutes with a temperature between about 70 ° C. and about 100 ° C. and a pressure between about 1 and about 5 bar, and then treated for about one to about ten minutes at a temperature between about 120 ° C. and about 145 ° C. and a pressure between about 10 and about 120 bar.

7. A membrane electrode assembly for polymer electrolyte membrane fuel cells, comprising:

a polymer electrolyte membrane with two opposite faces, wherein one face forms an anode side of a fuel cell, and the second face forms a cathode side of a fuel cell;

a catalyst layer disposed on the cathode and the anode side; and, a gas distribution layer on each side of the anode and cathode sides, wherein the gas distribution layers comprise a hydrophobized carbon substrate, the gas distribution layers are in direct contact with the catalyst layers in the membrane electrode assembly, and the membrane electrode assembly is made while the catalyst layers are moist.

8. A membrane electrode assembly according to claim 7, wherein the hydrophobized carbon substrate is selected from the group consisting of a carbon fiber fabric, a carbon fiber non-woven, a graphite felt, and carbon fiber paper.

9. A membrane electrode assembly for fuel cells, made by the process of claim 1.

* * * * *